(12) United States Patent
Birecki et al.

(10) Patent No.: US 9,046,733 B2
(45) Date of Patent: Jun. 2, 2015

(54) E-PAPER PRINTING SYSTEM

(71) Applicant: HEWLETT-PACKARD DEVELOPMENT COMPANY, L.P., Houston, TX (US)

(72) Inventors: Henryk Birecki, Palo Alto, CA (US); Napoleon J Leoni, Palo Alto, CA (US); Omer Gila, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/572,525

(22) Filed: Dec. 16, 2014

(65) Prior Publication Data
US 2015/0103395 A1    Apr. 16, 2015

Related U.S. Application Data

(63) Continuation of application No. 13/756,066, filed on Jan. 31, 2013, now Pat. No. 8,941,636.

(51) Int. Cl.
| | |
|---|---|
| *G06F 3/038* | (2013.01) |
| *G09G 5/00* | (2006.01) |
| *G02F 1/167* | (2006.01) |
| *H01R 43/00* | (2006.01) |

(52) U.S. Cl.
CPC ............. *G02F 1/167* (2013.01); *H01R 43/00* (2013.01); *G02F 2001/1676* (2013.01)

(58) Field of Classification Search
USPC .......................................................... 345/211
See application file for complete search history.

(56) References Cited

U.S. PATENT DOCUMENTS

| | | | |
|---|---|---|---|
| 7,114,864 B2 | 10/2006 | Shimoda et al. | |
| 2003/0067427 A1* | 4/2003 | Comiskey et al. | 345/84 |
| 2011/0181532 A1 | 7/2011 | Pan et al. | |
| 2011/0298760 A1 | 12/2011 | Gila et al. | |
| 2012/0274620 A1 | 11/2012 | Hwang et al. | |

OTHER PUBLICATIONS

You, H. et al.; "Electrowetting on Flexible Substrates"; Oct. 27, 2011; http://www.nanolab.uc.edu/Publications/PDFfiles/396.pdf.

* cited by examiner

*Primary Examiner* — Charles V Hicks
(74) *Attorney, Agent, or Firm* — Jeff Riddle

(57) ABSTRACT

An e-paper printing system comprising a set of electrodes comprising a number of electrodes to erase a portion of e-paper as the e-paper moves relative to the set of electrodes in which the set of electrodes causes a first electric field to be applied to the e-paper with a magnitude of the first electric field increasing at a first rate sufficiently high to cause the erasure of the portion of the e-paper, and causes a second electric field to be applied to the e-paper with a magnitude of the second electric field decreasing at a second rate that is sufficiently low to preserve the erasure of the portion of the e-paper.

19 Claims, 8 Drawing Sheets

E-PAPER PRINTING SYSTEM

CROSS-REFERENCE TO RELATED APPLICATIONS

This application is a Continuation of copending U.S. patent application Ser. No. 13/756,066, filed on Jan. 31, 2013, and incorporated herein by reference.

BACKGROUND

Electronic paper ("e-paper") is a display technology designed to recreate the appearance of ink on ordinary paper. E-paper reflects light like ordinary paper and may be capable of displaying text and images indefinitely without using electricity to refresh the image. This may be accomplished while still allowing the image to be changed later. E-paper can also be implemented as a flexible, thin sheet, similar to paper. By contrast, a flat panel display does not exhibit the same flexibility, uses a backlight to illuminate pixels, and constantly uses power during the display. E-paper implementations, such as electronic books ("e-books"), include an e-paper display and electronics for rendering and displaying digital media on the e-paper.

BRIEF DESCRIPTION OF THE DRAWINGS

The accompanying drawings illustrate various examples of the principles described herein and are a part of the specification. The examples do not limit the scope of the claims.

Throughout the drawings, identical reference numbers designate similar, but not necessarily identical, elements.

DETAILED DESCRIPTION

Figure 1:
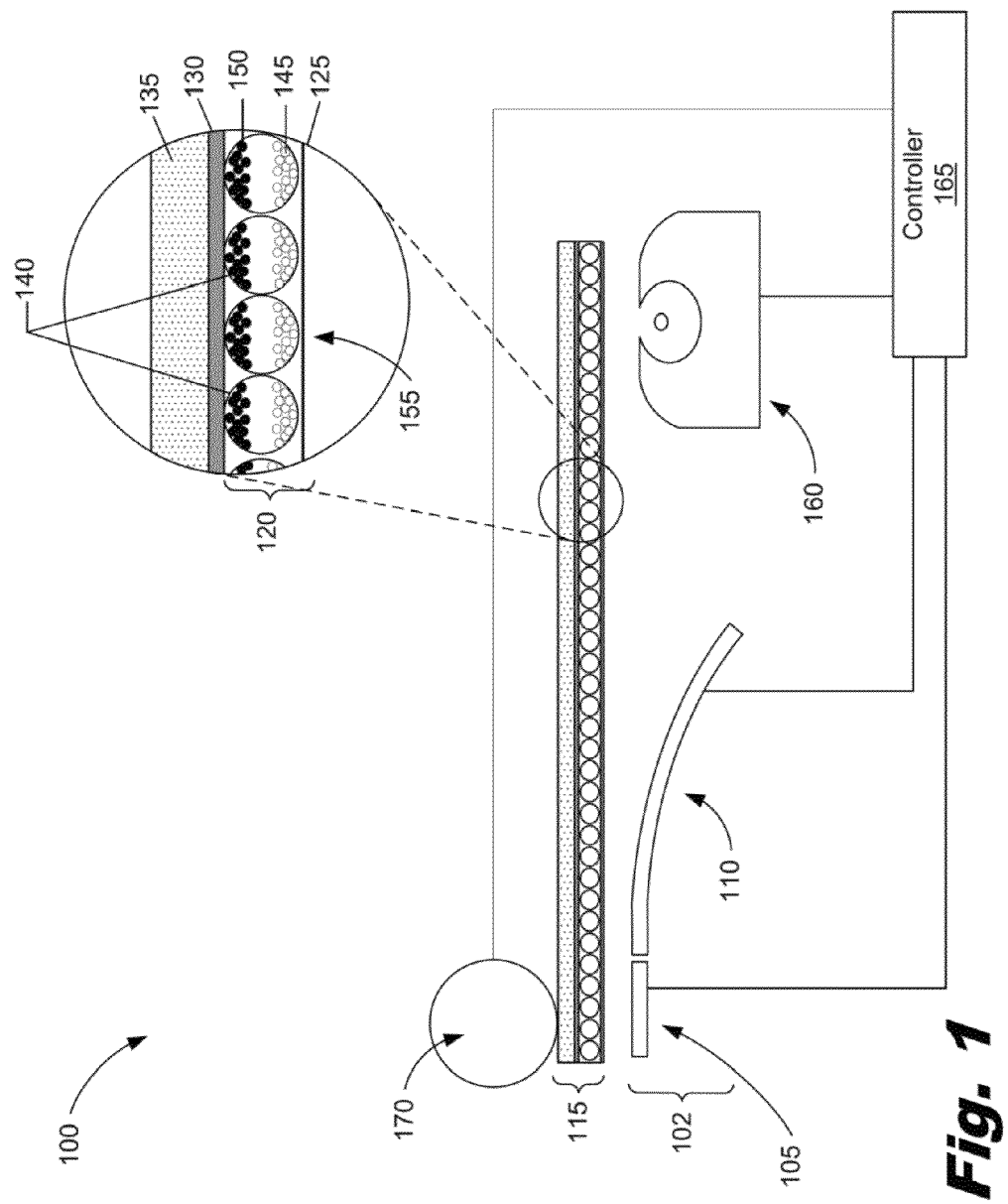
FIG. 1 is a block diagram of an e-paper printing device according to one example of the principles described herein.

As described above, e-paper is used in a variety of display applications such as signage, e-books, tablets, cards, posters, and pricing labels. E-paper has several paper-like features. For example, e-paper is a reflective display that uses ambient light as an illumination source. The ambient light strikes the surface and is reflected to the viewer. The usage of pigments similar to those which are used in printing allows the e-paper to be read at a vide range of angles and lighting conditions, including full sunlight. The use of ambient light also reduces the amount of power used in connection with the e-paper instead of constantly having power produced by a device. This also minimizes the amount of energy consumed through the use of the e-paper. E-paper does not use energy to maintain the image, and as a result, once the image is written, the image remains on the e-paper for an extended period of time or until the e-paper is rewritten. Thus, an e-paper may primarily use energy for changes of state.

E-paper is written by generating a charge on a surface in proximity to a layer of microcapsules that contain charged pigment particles. The charge on the surface attracts or repels the charged pigment panicles in the microcapsules to create the desired image. The pigment particles are stable within the microcapsules after they are moved into position. However, a wide variety of methods can be used to alter the image or text on the e-paper after it has been written. This can restrict the use of e-paper to applications that do not require the images or text to be secure against alteration.

E-paper may be erased using a negative corona discharge mechanism. The negative corona discharge mechanism produces a negative electrical discharge brought on by the ionization of a fluid surrounding a conductor that is electrically energized. The negative electrical discharge created by the negative corona discharge mechanism is directed towards the e-paper resulting in the e-paper being erased. However, the use of a negative corona discharge mechanism can be disadvantageous. Specifically, the negatively charged corona created by the negative corona discharge mechanism is unstable resulting in irreproducible e-paper marking or erasure. In addition a negatively charged corona generates an amount of ozone ($O_3$) above what a positively charged corona does. This may lead to potential environmental issues when operating an e-card printer that implements a negative corona discharge mechanism.

The present application, therefore, describes an e-paper printing system comprising a set of electrodes comprising a number of electrodes to erase a portion of e-paper as the e-paper moves relative to the of electrodes in which the set of electrodes causes a first electric field to be applied to the e-paper with a magnitude of the first electric field increasing at a first rate sufficiently high to cause the erasure of the portion of the e-paper, and causes a second electric field to be applied to the e-paper with a magnitude of the second electric field decreasing at a second rate that is sufficiently low to preserve the erasure of the portion of the e-paper.

The present application further describes method of manufacturing an e-paper erasure device comprising electrically coupling an erasing electrode to a voltage controller; the erasing electrode to erase a portion of e-paper in which the erasing electrode is shaped to create a varying gap between a counter electrode so as to cause, during relative motion of the e-paper to the erasing electrode a first electric field to be applied to the e-paper with the magnitude of the first electric field increasing at a first rate sufficiently high to cause the erasure of the portion of the e-paper, and at an area downstream where the first electric field is applied to the e-paper, a second electric field to be applied to the e-paper with the magnitude of the second electric field decreasing at a second rate sufficiently low to preserve the erasure of the portion of e-paper.

The present application also describes a computer program product for erasing e-paper, the computer program product comprising a computer readable storage medium comprising computer usable program code embodied therewith, the computer usable program code comprising computer usable program code to, when executed by a processor, cause a first electric field to be applied to the e-paper by a shaped erasing electrode, in which the magnitude of the first electric field increases at a first rate sufficiently high to cause the erasure of a portion of the e-paper and computer usable program code to, when executed by a processor, cause a second electric field to be applied to the e-paper by the shaped erasing electrode, in which the magnitude of the second electric field decreases at a second rate sufficiently low to preserve a the erasure of the portion of e-paper area.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language indicates that a particular feature, structure, or characteristic described in connection with that example is included as described, but may not be included in other examples.

FIG. 1 is a block diagram of an e-paper printing device (100) according to one example of the principles described herein. The e-paper printing device (100) may comprise a curved erasure electrode (102) comprising a number of electrodes. Although FIG. 1 shows a curved erasure electrode (102), other examples exist where the curved erasure electrode (102) may be formed into other shapes so as to provide a similar effect of varying a gap between the electrode (102) and the e-paper (115). Therefore, the curved erasure electrode (102) is merely one example.

In the example shown in FIG. 1, the curved erasure electrode includes a ground electrode (105) and a charged electrode (110). Both the ground electrode (105) and charged electrode (110) in conjunction with a conductive ground layer (130) associated with the e-paper (115) may cause a rapidly increasing electric field to be applied to the e-paper (115) using a specific voltage which will be discussed in more detail below. The ground electrode (105) and the charged electrode (110) may be shaped such that the timing of the field applied to the e-paper is controlled as the e-paper and erasure electrode (102) are moved relative to each other. Because the rate at which the electric field changes has an effect on the quality of erasure of the e-paper, a slow increase in the electric field will not provide a quality erasure of the e-paper. Instead, a rapidly increasing field is applied to the e-paper. This rapidly increasing field is provided by the ground electrode (105) and charged electrode (110) together. In FIG. 1, the rapidly increasing field is applied to the e-paper as the e-paper crosses a gap between the ground electrode (105) and the charged electrode (110). This rapid application of the electric field causes the oppositely charged particles in the e-paper to move either towards or away from the surface (155) of the e-paper (115) causing a previous image to be erased.

In one example, the charged electrode (110) may be negatively charged at, for example, −2 kV. In this example, as the e-paper (115) is translated over the erasure electrode (102) the positively charged particles (i.e., 150) may be attracted to the surface (155) while the negatively charged particles (i.e., 145) are repelled from the surface (155). In another example, the charge electrode (110) may be positively charged at for example, +2 kV. In this example, as the e-paper is translated over the erasure electrode (102), the positively charged particles (i.e., 150) may be repelled from the surface (155) while the negatively charged particles (i.e., 145) are attracted to the surface (155). Therefore, the present example contemplates the use of a number of combinations of negatively or positively charged, erasure electrodes (102) and particles (145, 150) that could result in the application of one charge on the e-paper (115) resulting in the erasure of the e-paper (115).

The e-paper (115) may be comprised of a number of layers. Specifically, the e-paper (115) may be comprised of a microcapsule layer (120) sandwiched between a transparent charge receiving layer (125) and a conductive ground layer (130). In one example, the conductive ground layer (130), microcapsule layer (120) and transparent charge receiving layer (125) may be disposed on a substrate (135).

The transparent charge receiving layer (125) may be comprised of a transparent polymer capable of receiving on its surface a lumber of charged particles from a corona discharge device. The conductive ground layer (130) may be composed of Indium-Tin Oxide (ITO). The substrate (135) can be composed of polyester, plastic, transparent MYLAR®, or other suitable material. Along with the conductive ground layer (130), the transparent charge receiving layer (125) may receive on its surface a number of electrons in the case of a negative corona discharge device or a number of ions in the case of a positively corona device. As these particles attach to the surface of the transparent charge receiving layer (125), the oppositely charged particles (145, 150) are attracted to them. Selectively applying a positive corona to the e-paper (115) may cause an image to be transferred to the e-paper (115).

Although FIG. 1 shows that the conductive ground layer (130) is physically coupled to the e-paper, other examples exist where the conductive ground layer may be a separate electrode within the printing device (100). In this example, the conductive ground layer (130) may act as a grounded counter electrode and placed opposite the curved erasure electrode (102). The grounded counter electrode may act as one of the set of electrodes by which the electric field applied to the e-paper is created. In this case, the term "grounded" is meant to be a relative term such that the static potential applied to the grounded counter electrode is the relative potential to which all other potentials applied to all other electrodes are measured.

The microcapsule layer (120) may be comprised of a number of microcapsules (140). In one example the microcapsules (140) may aligned as a single layer of microcapsules (140). In FIG. 1, each microcapsule (140) further includes both white particles (145) and black particles (150) suspended in a fluid medium. Because the white particles (145) and black particles (150) are suspended in a fluid medium, they may be manipulated in the presence of an electric field such that they are either repelled away from or attracted to the surface (155) of the e-paper (115) depending on a charge associated with each type of particle. Ambient light is allowed to be transmitted through the charge receiving layer (125), strike the particles (145, 150), and reflect back to the viewer. As a result, when white particles (145) of a microcapsule (140) are located near the transparent charge receiving layer (125), the microcapsule (140) appears white to a viewer. When the black particles (150) of a microcapsule (140) are located near the transparent charge receiving layer (125) the microcapsule (140) appears black to the viewer.

Each type of particle (145, 150) may have a charge associated with it. These charged particles (145, 150) may be moved within the microcapsules (140) under the influence of an electric field or an induced current. The application of the electric field by for example, the erasure electrode (102) creates capacitive currents ($I_{cap}=C*(dV/dt)$) inside the e-paper (115). The capacitive currents are field change rate dependent and is proportional to the rate of change of applied electric field. The particles (145, 150), however, may experience other forces acting upon them such as motion induced drag due to the viscosity of the solution the particles (145, 150) are in, the elastic forces due to the inclusion of a crosslinked polymeric matrix, the number of particles (145, 150) per unit area, among others. Each of these factors may increase or decrease the resistance of the particles (145, 150) to change position within the microcapsules (140) under the influence of the electric field. As will be discussed below, the sharp increase in the electric field combined with a gradual reduction in that electric field will cause the particles (145, 150) to maintain the state they were in after the sharp increase in the electric field. This is because a decaying resistive current is experienced by individual particles (145, 150).

In one example, tea black articles (150) may be positively charged particles and the white particles (45) may be negatively charged particles. In this example, various shades of gray can be created by varying the arrangement of alternating microcapsules with white (145) and black (150) particles located near the charge receiving layer (125) to produce half-toning. Other examples exist where the black particles (150) are negatively charged and the white particles (145) are positively charged.

Although, in the above description, the microcapsules (140) are described to comprise black (150) and white (145) particles, any type or color of particles may be used. Therefore in another example, only white particles (145) are used. In another example, only black particles (150) are used. Therefore, the present specification contemplates the use of these other examples.

In operation, the e-paper printing device (100) passes a sheet of e-paper across the electrodes (105, 110) causing an erasure of the image on the e-paper. A voltage controller (165) may cause an electrical charge to be applied to the charged electrode (110) and cause the ground electrode to be grounded. As will be described later, the voltage controller (165) may also control a corona device (160) such that electrical charge applied to the corona device (160) causes the corona device (160) to produce a corona sufficient to write to the e-paper.

In one example, the relative movement of the e-paper (115) to the electrodes (105, 110) may be accomplished through the use of a translator (170). In the example of FIG. 1, the translator (170) is a roller. Although FIG. 1 shows that e-paper is passed over the electrodes (105, 110), in another example the e-paper printing device (100) may cause the electrodes (105, 110) to pass over the e-paper while the e-paper is left stationary. Therefore, the present specification contemplates an e-paper printing device (100) which passes e-paper over an electrode (105, 110), passes an electrode (105, 110) over the e-paper, or combinations thereof so as to erase the e-paper.

As discussed above, according to the example in FIG. 1 as the e-paper passes over the ground electrode (105), it is shielded from any electrical potential. However, as the e-paper begins to pass over the charged electrode (110), the e-paper experiences an abrupt change from a zero field to some maximum field which the charged electrode (110) produces. In one example, the voltage controller (165) may cause the charged electrode (110) to maintain a constant voltage and thus a constant electrical field. In another example, the voltage controller (105) may cause the charged electrode (110) to produce a variable electrical field by applying a variable electrical voltage to the charged electrode (110).

The maximum field will depend both on the voltage applied to the charged electrode (110) as well as the properties of the e-paper such as the charges of the particles (145, 150). In one example, the time span between applying a zero field to a maximum field is between 20 ms and 50 ms.

In addition to the abrupt change in the field produced, the shape of the charged electrode (110) also provide for better erasing of the image. As seen in FIG. 1, the charged electrode (110) is shaped such that electrical field is gradually reduced as any portion of the e-paper is passed over it. In one example, the charged electrode (110) has a bent shape such that the radius is around 1 inch. The speed at which the e-paper is passed over these electrodes (105, 110) is about 1 in or 2 inches per second. The gradual reduction in the field results in the preservation of the erased state on the e-paper.

After erasure, the e-paper may then also be written to by passing it over a positive corona device (100). As discussed above, the positive corona device (160) may selectively apply positive ions to the surface of the e-paper, causing one type of pigment (145, 150) to be attracted to the surface (155) of the e-paper (115) thereby causing an image to form on the e-paper (115). In another example, a negatively charged corona device may be used instead of the positively charged corona device (160) if the e-paper has first been erased via the printing device (100) such that the negatively charged particles in the e-paper are already presented closer to the transparent charge receiving layer (125).

Figure 2:
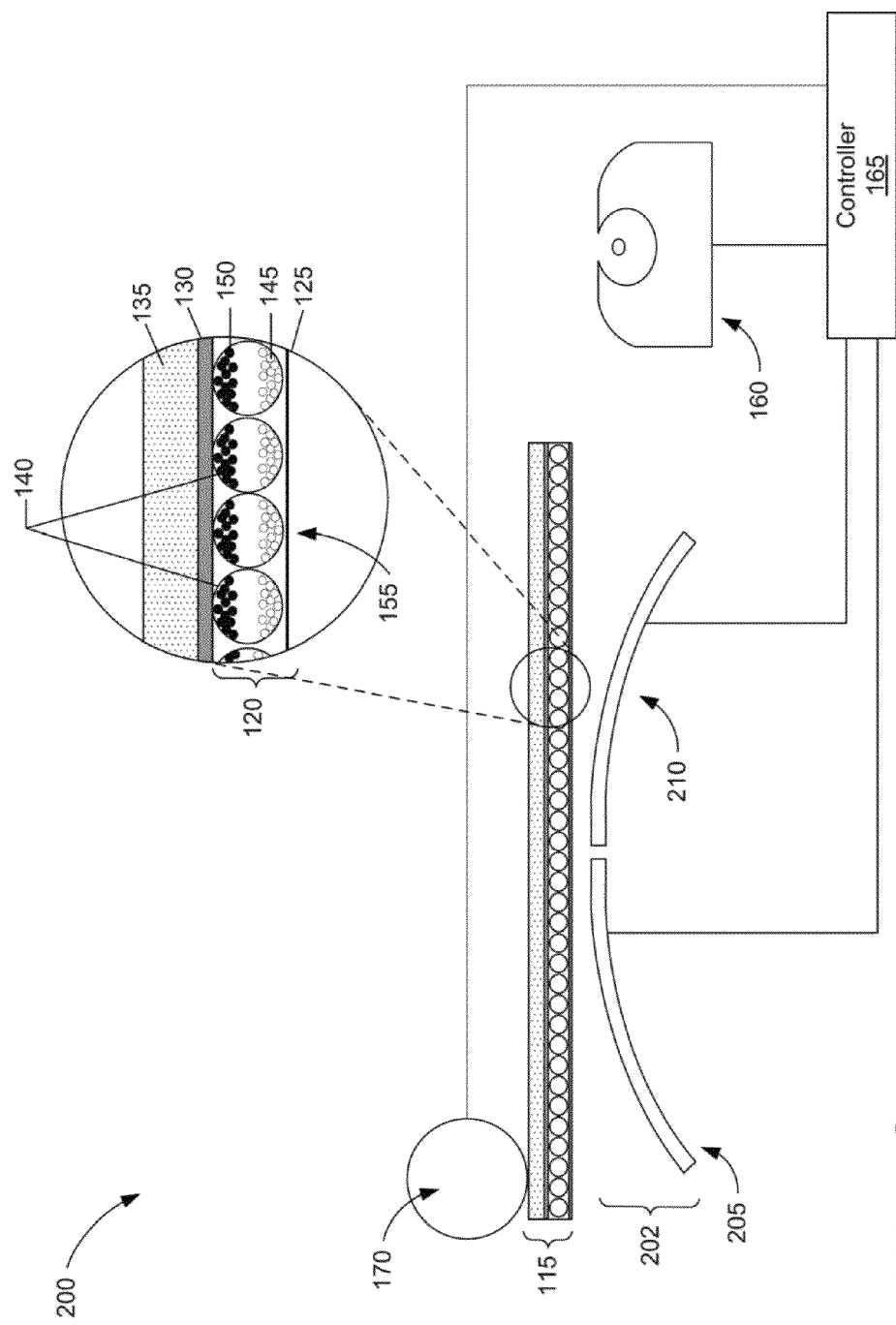
FIG. 2 is a block diagram of an e-paper printing device according to another example of the principles described herein.

FIG. 2 is a block diagram of an e-paper printing device (200) according to another example of the principles described herein. In this figure, a curved electrode may comprise two charged electrodes (205, 210); one that is positively charged and one that is negatively charged. In one example, both electrodes (205, 210) are shaped so as to apply a variable field to the e-paper as the e-paper passes over them. The electrical charge applied to the charged electrodes (205, 210) may be exclusively opposite of each other. If the first charged electrode (205) is positive, then the second charged electrode (210) is negative and visa versa. Therefore, unlike in FIG. 1, as the e-paper passes over the electrodes (205, 210) the e-paper (115) is subjected to, for example, a negative electrical field first and then a rapid positive electrical field as it passes over to the second electrode (210). Both charged electrodes (205, 210) are curved such that the e-paper is subjected to both a gradually increasing negative electrical field and a suddenly increasing but gradually decreasing positive electrical field. As the e-paper is subjected to the negative electrical field, little if no effect will be demonstrated on the image on the e-paper. As the e-paper crosses the gap, however, a double voltage step voltage (from negative to neutral and from neutral to positive electrical field) is experienced by the e-paper (115) and the erasing process begins. As the positive electrical field is gradually reduced due to the shape of the second electrode (210) this will preserve the erased state on the e-paper.

Turning now to both FIGS. 1 and 2, in one example the electrodes (105, 110, 205, 210) may be covered with a dielectric material. The dielectric material may be used to prevent arcing between the electrodes (105, 110, 205, 210). Additionally, the dielectric material may be used as a spacer to keep a small and accurate gap between the electrodes (105, 110, 205, 210) and the e-paper (115).

Additionally, in one example, the electrodes (105, 110, 205, 210) may be formed into a roller. The roller may therefore be used to both provide transport capability of the e-paper as well as the electric field.

In another example, the charged electrodes (110, 210) may be formed into a single planar electrode and may be used to erase the e-paper (115) using a voltage waveform. In this example, the e-paper (115) may be written to by applying a voltage at to the e-paper (115) while the e-paper (115) remains still relative to the electrode. The e-paper may then be erased (reset) by the application of a voltage waveform to the electrode at a first rate. The erased state of the e-paper (115) may then be maintained by applying a gradually decreasing voltage to the charged electrodes (110, 210) at a second rate. In this example, the first rate is relatively faster than the second rate. Alternatively, a series of alternated finger electrodes may be used to generate multiple write/erase cycles as the e-paper is moved through the printer (100, 200).

Figure 3:
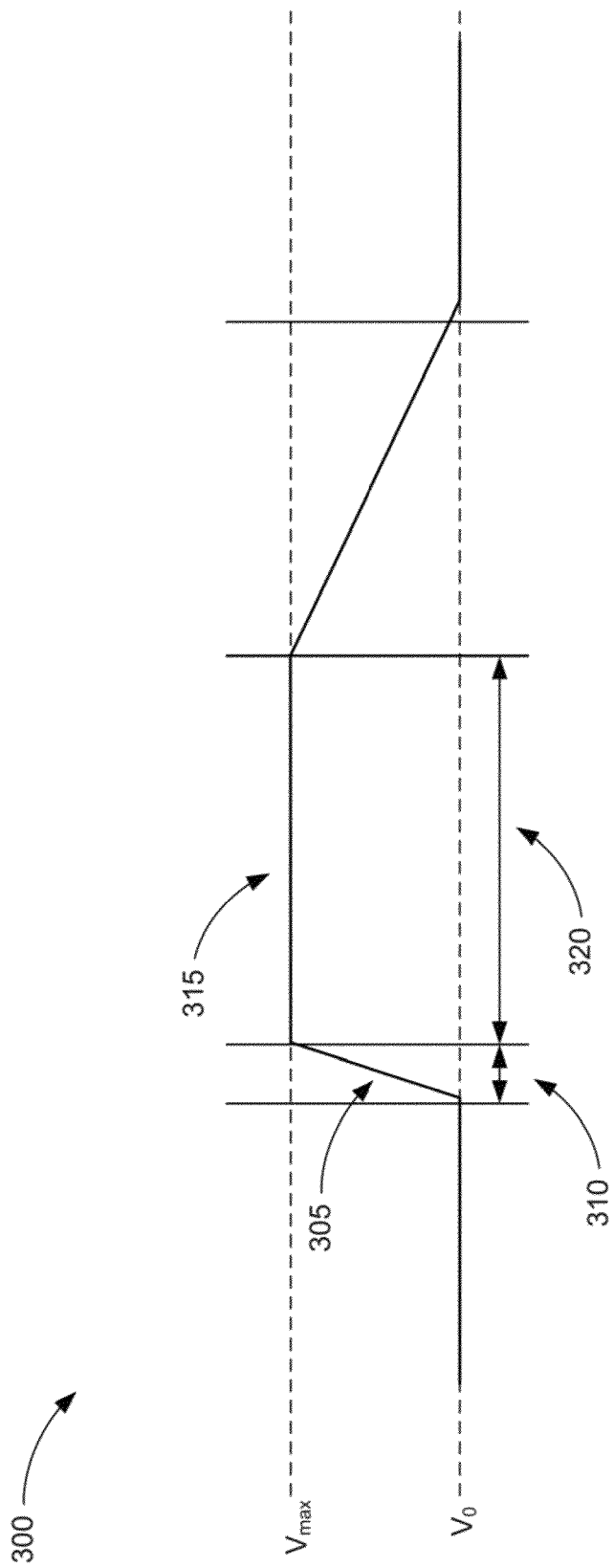
FIG. 3 depicts a waveform used as an erase pulse and is applied to the electrodes as the e-paper is passed through the printing device of FIGS. 1 and 2 according to one example of the principles described herein.

FIG. 3 depicts a waveform (300) used as an erase pulse and applied to the electrodes (FIG. 1, 105, 110; FIG. 2, 205, 210) as the e-paper is passed through the printer (FIG. 1, 100; FIG. 2, 200) according to one example of the principles described herein. The erase pulse may be initiated by the erasure electrode (110, 210) as described in FIGS. 1 and 2. In this case, as the e-paper (115) approaches the erasure electrode (110, 210) it experiences a shape rise (305) in electrical field due to the voltage applied to the erasure electrode (110, 210). In one example the time (310) that this takes is around 1 ms. The e-paper then experiences a holding electrical field (315) for a certain length of time (320). This length of time may be up to 200 ms. Because the erasure electrode (110, 210) is curved away from the e-paper (115) as the e-paper (115) passes it, the e-paper (115) experiences a decaying electrical field (325) for a length of time (330). This length of time may be anywhere from 10 ms to 0.5 sec.

Figure 4:
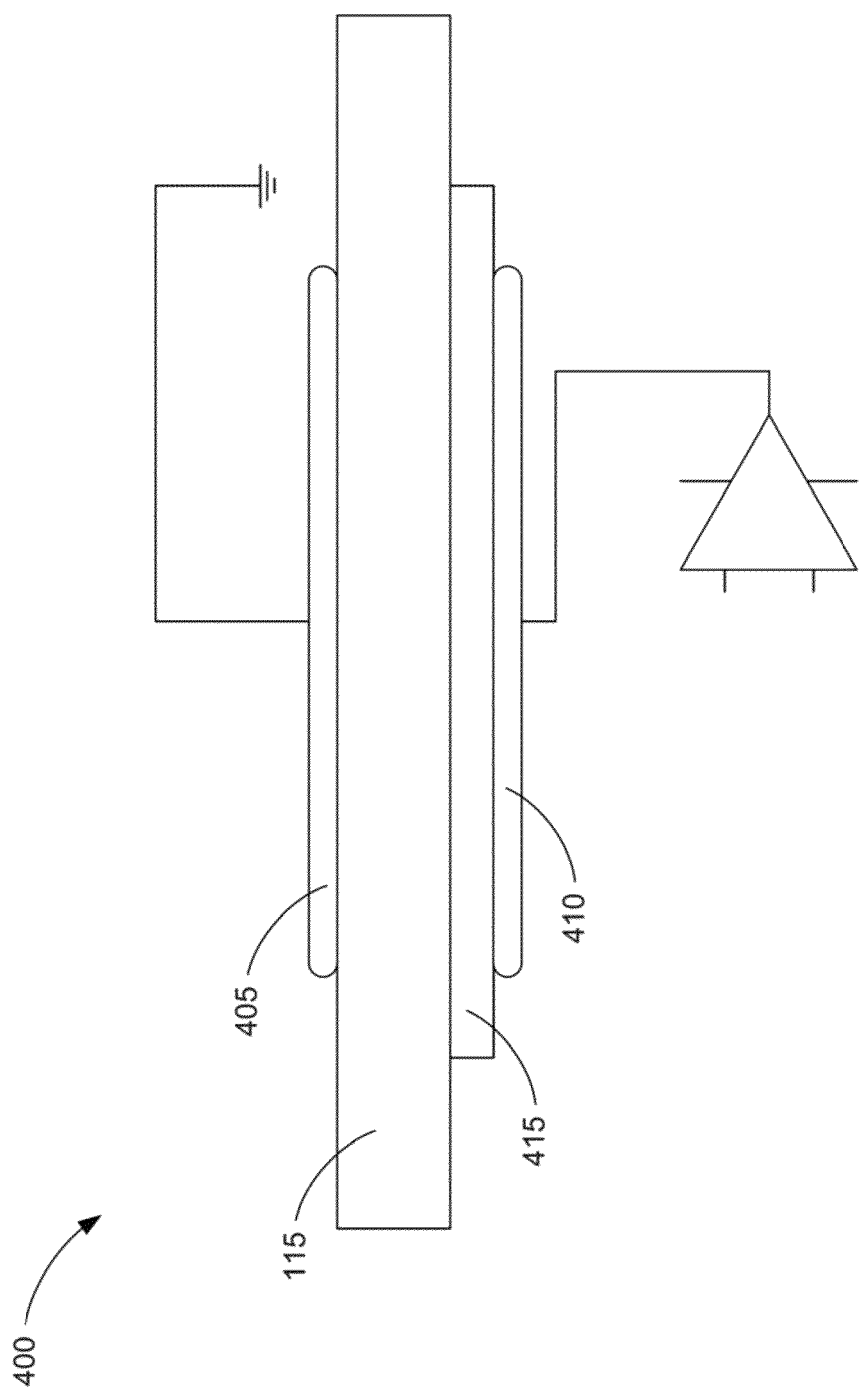
FIG. 4 is a block diagram of an apparatus used to test the e-paper of FIGS. 1 and 2 according to one example of the principles described herein.

Using the waveform (300) described above, a sheet of e-paper (115) was tested using the apparatus described in FIG. 4. FIG. 4 is a block diagram of an apparatus (400) used to test the e-paper (115) of FIGS. 1 and 2 according to one example of the principles described herein. In operation, a piece of e-paper (115) is placed between a ground electrode (405) and a excitation electrode (410). Additionally, the apparatus (400) may also comprise a dielectric layer (415) placed between the excitation electrode (410) and the e-paper (115). The excitation electrode (410) may have a voltage applied to it according to the waveform (300) as described in connection with FIG. 3. The results of both a writing and erasing pulse are shown in FIG. 5.

Figure 5:
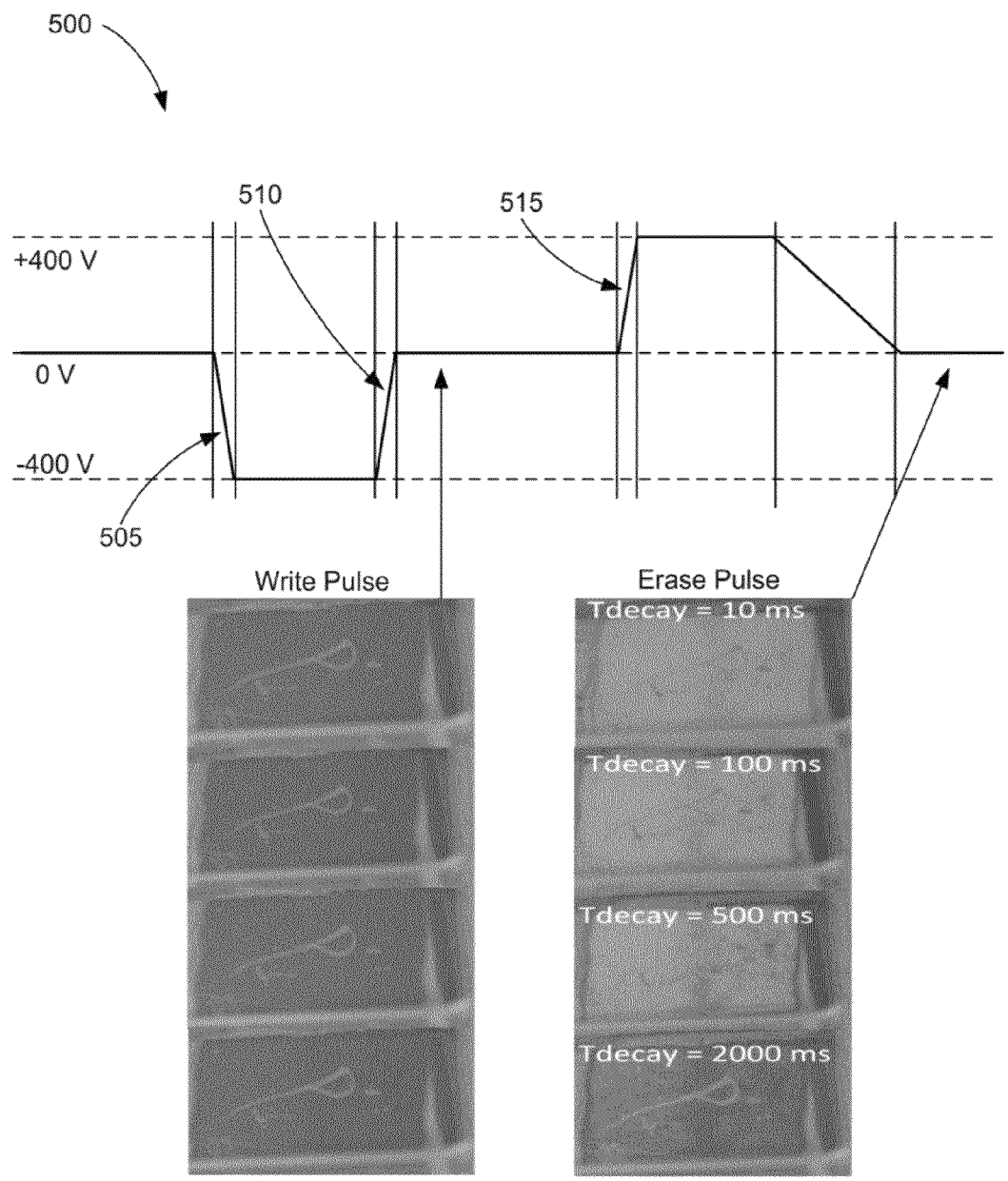
FIG. 5 depicts a waveform used as a write and erase pulse and is applied to the electrodes as the e-paper is passed through the printing device of FIGS. 1 and 2 according to one example of the principles described herein.

FIG. 5 depicts a waveform (500) used as a write and erase pulse and is applied to the electrodes as the e-paper (115) is passed through the printer (100, 200) of FIGS. 1 and 2 according to one example of the principles described herein. Using the apparatus described in FIG. 4, the e-paper (115) was imaged using alternating writing pulses and erase pulses. Each sharp change in voltage (505, 510, 515) may last around 1 ms.

FIG. 5 further comprises a number of photos. Each photo shows the resulting image obtained in the e-paper media after the indicated transition for different decay times in the erase pulse. In this case if the objective was to erase (i.e., turn e-paper media to white) then the field is made to rise in less than 100 ms for a low background condition. As can be seen, at a 2 second rise time the erasure is not effective at all. With this data and the operating speed of the e-paper printer (100, 200) the electrode (105, 110, 205, 210) configuration as described and shown in FIGS. 1 and 3 are designed to provide effective erasure of the e-paper (115). This example has been provided as a way to quantify the field change rates used to provide an erasure transition. In the examples above with the shaped electrode having stationary potentials, the temporal electrical field transitions are the result of the convolution of the temporally invariant fields at a fixed location as the e-paper moves relative to the electrodes. It should also be noted that because the e-paper responds to pulses up to a certain frequency, a superimposed periodic signal of a frequency higher than this response time on top of the stationary potentials would not affect the erasure operation.

Figure 6:
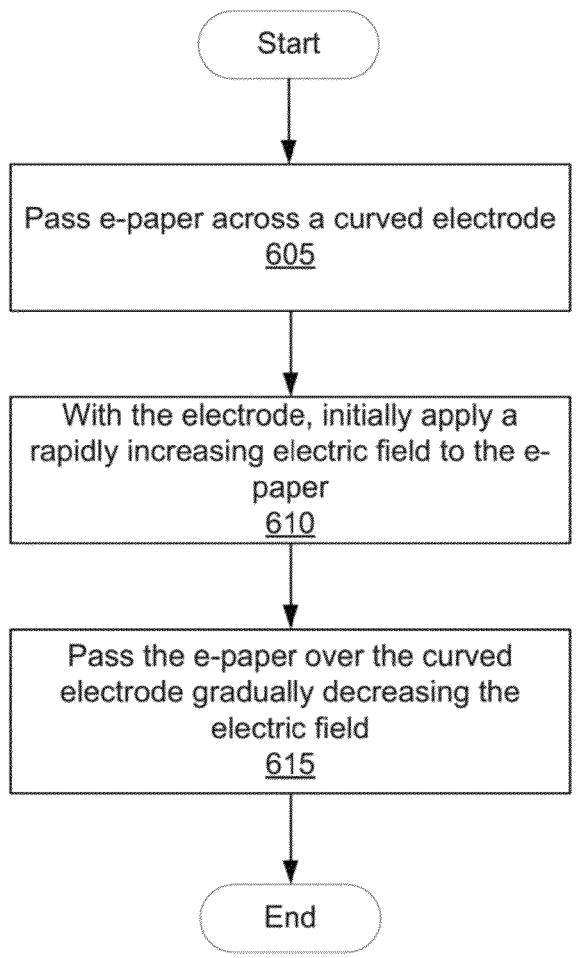
FIG. 6 is a flowchart showing a method of erasing e-paper according to one example of principles described herein.

FIG. 6 is a flowchart showing a method of block erasing e-paper according to one example of principles described herein. The method may begin with passing (605) the sheet of e-paper across a curved electrode. As described above, the electrode may have a voltage applied to it in order to create an electric field. In one example, the e-paper printer (100, 200) may further comprise a roller to translate the e-paper through the printer (100, 200) and across the electrode (110, 210). In another example, the electrode (110, 210) may be placed on a roller which, when rotated, provides both the translation of the e-paper (115) through the printer (100, 200) as well as apply the electric field to the e-paper (115).

As the e-paper is passed over the electrode, the electrode initially applies (610) a rapidly increasing electric field to the e-paper. The rapidly increasing electric field may be applied (610) to the e-paper in about 1 ms. Again, as described above, the polarity of the electric field applied to the e-paper may depend on the properties, of the e-paper. In one example, the rapidly increasing field may be facilitated by the use of a ground electrode (105) placed immediately before the charged electrode (110). In another example, the rapidly increasing field may be facilitated by the use of a oppositely charged electrode (205) placed immediately before the erasure electrode (210).

As the e-paper is passed (605) over the electrode and the rapidly increasing electric field is applied (610), the electric field may be gradually decreased (615) to preserve the erased state on the e-paper.

Figure 7:
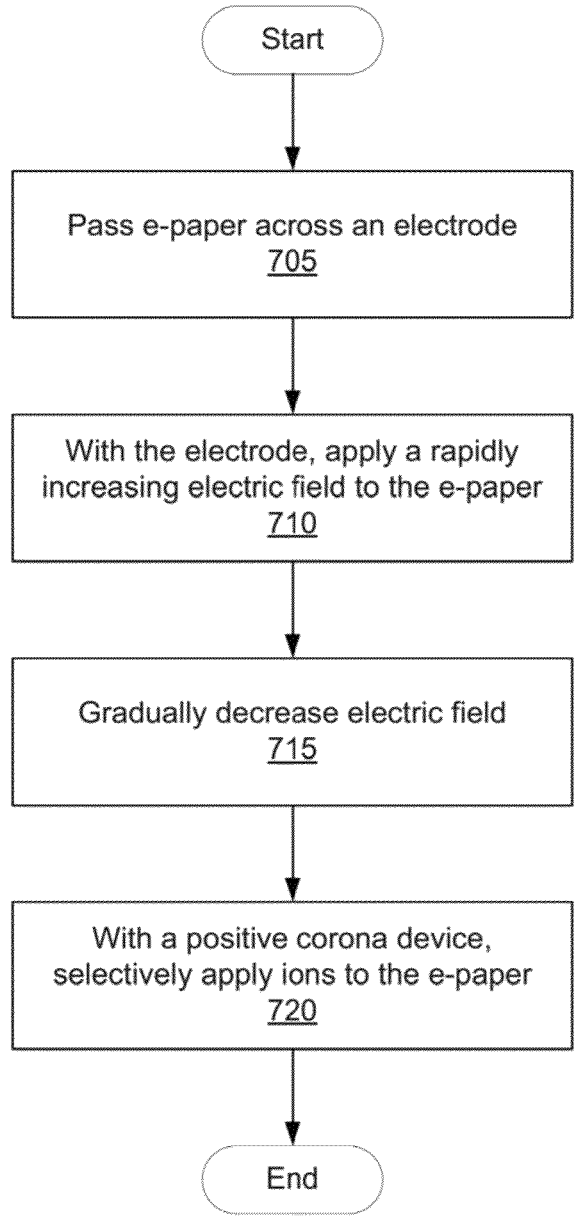
FIG. 7 is a flowchart showing a method of erasing e-paper according to another example of principles described herein.

Referring now to FIG. 7, in one example, after the e-paper has been passed (705) across the electrode, the electric field is applied (710) to the e-paper, and then gradually decreased (715), a positive corona device may selectively apply (720) positively charged ions to the surface of the e-paper. This creates the image of the e-paper.

The present specification further contemplates the use of a computer program product to affect the methods described above. Therefore, in one example, the present specification contemplates a computer program product for block erasing e-paper, the computer program product comprising a computer readable storage medium comprising computer usable program code embodied therewith, the computer usable program code comprising computer usable program code to, when executed by a processor, create an electrical pulse with the waveform (300) depicted in FIG. 3 during translation of a piece of e-paper (115) across an electrode. As described above, the waveform (300) rapidly applies an electric field in about 1 ms. The computer usable program code may further comprise computer usable program code to when executed by a processor, gradually decrease the electric field created as the e-paper passes over the electrode. Because of the curved shape of the electrode, the electric field is gradually decreased as the e-paper continues through the e-paper printer (100, 200).

The specification and figures describe a system and method to block erase e-paper. The erasing device and printer described herein allows a piece of e-paper to be printed to rapidly without using a negatively charged corona device to first erase the e-paper. As described above, using a negatively charged corona device to erase the e-paper results in ozone being created. Additionally, a negatively charged corona device is unstable resulting in irreproducible e-paper marking or erasure.

Figure 8:
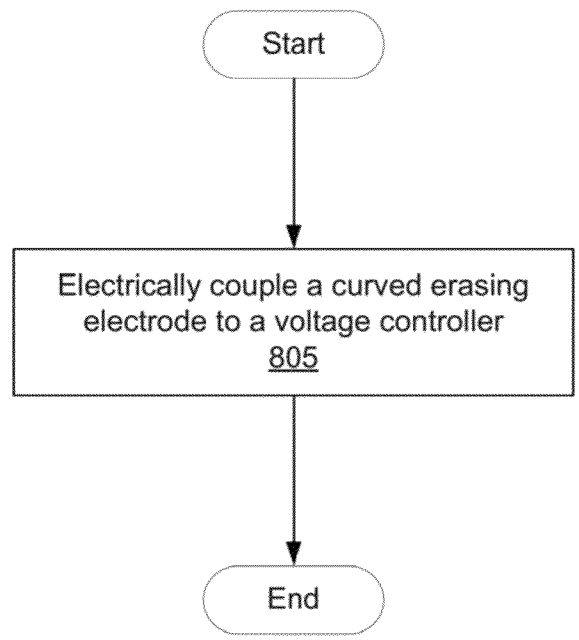
FIG. 8 is a flowchart showing a method of manufacturing an e-paper erasure device according to one example of the principles described herein.

Turing now to FIG. 8, a flowchart showing a method (800) of manufacturing an e-paper (115) printing device (100, 200) is shown according to one example of the principles described herein. The process may begin by electrically coupling (805) an erasing electrode to a voltage waveform controller. As described above, the erasing electrode (102, 202) may comprise a ground electrode (105) and a charged electrode (110) or oppositely charged electrodes (205, 210). The voltage controller (165) may apply a voltage to the electrodes (110, 205, 210) sufficient to erase the e-paper and maintain the erase state of the e-paper as the e-paper is passed over the electrodes (105, 110, 205, 210). The method (800) may further include operatively coupling a translator (170) to the voltage controller (165) such that the voltage controller (165) may also cause the e-paper (115) to pass over the electrodes (105, 110, 205, 210). The voltage controller (165) may control the speed at which the e-paper (115) passes over the electrodes (105, 110, 205, 210). The method (800) may also comprise operatively coupling a printing device (160) to the voltage controller (165) such that the voltage controller (165) may also control when and how the printer (160) causes an image to be applied to the e-paper (115). The printing device (160) may be a positive corona device as described above.

The preceding description has been presented to illustrate and describe examples of the principles described. This description is not intended to be exhaustive or to limit these principles to any precise form disclosed. Many modifications and variations are possible in light of the above teaching.

What is claimed is:

1. An e-paper printing system comprising:
    a ground electrode;
    an excitation electrode; and
    a controller to apply a voltage waveform to the excitation electrode to erase a portion of e-paper between the ground electrode and the excitation electrode,
    wherein the voltage waveform causes a first electric field to be applied to the e-paper with a magnitude of the first electric field increasing at a first rate sufficiently high to cause the erasure of the portion of the e-paper and causes a second electric field to be applied to the e-paper with a magnitude of the second electric field decreasing at a second rate that is sufficiently low to preserve the erasure of the portion of the e-paper.

2. The e-paper printing system of claim 1, wherein the ground electrode is a planar ground electrode, and
    wherein the excitation electrode is a planar excitation electrode.

3. The e-paper printing system of claim 1, further comprising:
    a dielectric layer placed between the excitation electrode and the e-paper.

4. The e-paper printing system of claim 1, wherein the first rate is greater than the second rate.

5. The e-paper printing system of claim 1, further comprising:
    a corona device to write to the e-paper.

6. The e-paper printing system of claim 1, wherein the voltage waveform comprises:
    a first portion in which a voltage applied to the excitation electrode rises from a first voltage to a second voltage during a first length of time;
    a second portion in which the voltage applied to the excitation electrode holds at the second voltage for a second length of time; and
    a third portion in which the voltage applied to the excitation electrode falls from the second voltage to the first voltage during a third length of time,
    wherein the first length of time is shorter than the second length of time and the third length of time.

7. The e-paper printing system of claim 1, further comprising:
    a series of alternated finger electrodes to generate multiple write/erase cycles as the e-paper is moved through the e-paper printing system.

8. An e-paper printing system comprising:
    a first electrode; and
    a curved second electrode held at an erasing potential;
    wherein the first electrode and the second electrode erase a portion of e-paper comprising a conductive ground layer as the e-paper moves relative to the first electrode and the second electrode in which the first electrode and the second electrode:
        cause a first electric field to be applied to the e-paper with a magnitude of the first electric field increasing at a first rate sufficiently high to cause the erasure of the portion of the e-paper; and
        cause a second electric field to be applied to the e-paper with a magnitude of the second electric field decreasing at a second rate that is sufficiently low to preserve the erasure of the portion of the e-paper.

9. The e-paper printing system of claim 8, wherein relative motion of the e-paper past the first electrode and then the second electrode initially causes the first electric field to be applied to the e-paper at the first rate and then causes the second electric field to be applied to the e-paper at the second rate.

10. The e-paper printing system of claim 8, wherein the first electrode is planar and grounded.

11. The e-paper printing system of claim 8, wherein the first electrode is curved and held at a potential having an opposite charge to the erasing potential.

12. The e-paper printing system of claim 8, further comprising:
    a dielectric material covering the first electrode and the second electrode.

13. The e-paper printing system of claim 12, wherein the dielectric material provides a spacer to set a gap between the first electrode and the second electrode and the e-paper.

14. A method of erasing e-paper, the method comprising:
    applying a voltage waveform to an excitation electrode to erase a portion of e-paper between the excitation electrode and a ground electrode,
    wherein the voltage waveform causes a first electric field to be applied to the e-paper with a magnitude of the first electric field increasing at a first rate sufficiently high to cause the erasure of the portion of the e-paper and causes a second electric field to be applied to the e-paper with a magnitude of the second electric field decreasing at a second rate that is sufficiently low to preserve the erasure of the portion of the e-paper.

15. The method of claim 14, wherein applying the voltage waveform comprises:
    applying a first portion of the voltage waveform in which a voltage applied to the excitation electrode rises from a first voltage to a second voltage during a first length of time;
    applying a second portion of the voltage waveform in which the voltage applied to the excitation electrode holds at the second voltage for a second length of time; and
    applying a third portion of the voltage waveform in which the voltage applied to the excitation electrode falls from the second voltage to the first voltage during a third length of time,
    wherein the first length of time is shorter than the second length of time and the third length of time.

16. The method of claim 14, wherein the voltage waveform causes the first electric field to be applied to the e-paper with the magnitude of the first electric field increasing at the first rate greater than the second rate.

17. The method of claim 14, wherein applying the voltage waveform comprises applying the voltage waveform to a planar excitation electrode to erase the portion of e-paper between the excitation electrode and a planar ground electrode.

19. The method of claim 18, further comprising:
moving the e-paper relative to the excitation electrode; and
applying the voltage waveform to the excitation electrode to erase another portion of the e-paper between the excitation electrode and the ground electrode.

18. The method of claim 14, wherein applying the voltage waveform comprises applying the voltage waveform while the e-paper remains still relative to the excitation electrode.

* * * * *